United States Patent [19]
Simone et al.

[11] Patent Number: 5,899,271
[45] Date of Patent: * May 4, 1999

[54] PARTICLE CONTROL SCREEN ASSEMBLY FOR A PERFORATED PIPE USED IN A WELL, A SAND FILTER SYSTEM, AND METHODS OF MAKING THE SAME

[75] Inventors: Anthony D. Simone; Michael J. Panciera, both of Greensboro, N.C.

[73] Assignee: Purolator Products Company, Tulsa, Okla.

[ * ] Notice: This patent is subject to a terminal disclaimer.

[21] Appl. No.: 09/116,719
[22] Filed: Jul. 16, 1998

Related U.S. Application Data

[62] Division of application No. 08/694,062, Aug. 8, 1996, Pat. No. 5,782,299.

[51] Int. Cl.$^6$ ..................................................... E21B 43/08
[52] U.S. Cl. ........................................... 166/230; 166/236
[58] Field of Search ................................... 166/228, 230, 166/234, 235, 236

[56] References Cited

U.S. PATENT DOCUMENTS

| | | | |
|---|---|---|---|
| 4,821,800 | 4/1989 | Scott et al. | 166/230 |
| 5,411,084 | 5/1995 | Padden | 166/230 |
| 5,624,560 | 4/1997 | Voll et al. | 166/230 |
| 5,642,781 | 7/1997 | Richard | 166/231 |
| 5,782,299 | 7/1998 | Simone et al. | 166/230 |

*Primary Examiner*—William Neuder
*Attorney, Agent, or Firm*—Joseph V. Tassone

[57] ABSTRACT

A particle control screen assembly for a perforated pipe used in a well, a sand filter system, and methods of making same are provided. The screen assembly includes a woven mesh filter media disposed about the perforated pipe, and a protective wrapper disposed about the filter media. The protective wrapper comprises an outer perforated layer and an inner layer that is disposed between the outer layer and the filter media. A surface of the inner layer that faces the outer perforated layer has a non-smooth contour, with this surface of the inner layer having portions in direct contact with an inner surface of the outer layer. The inner layer is provided with apertures that are disposed in such a way that fluid cannot flow from the outer surface of the outer perforated layer directly radially both through holes of the outer layer and through the apertures of the inner layer.

20 Claims, 4 Drawing Sheets

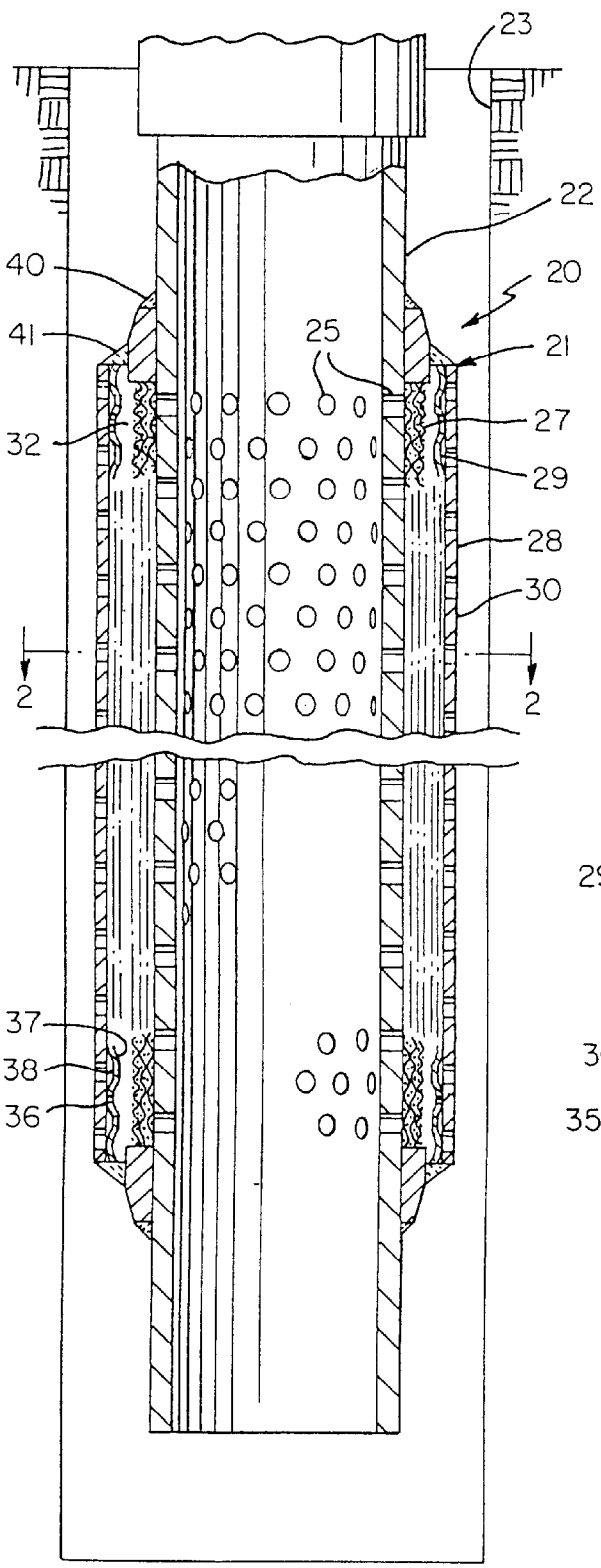
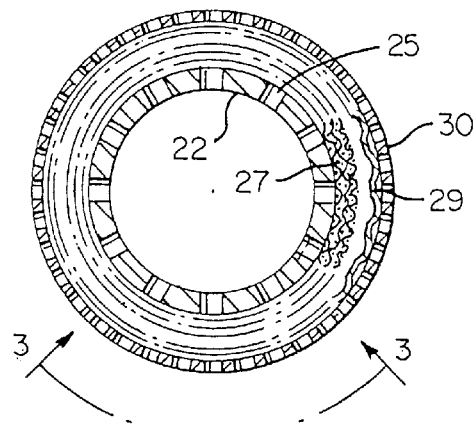
FIG. 2
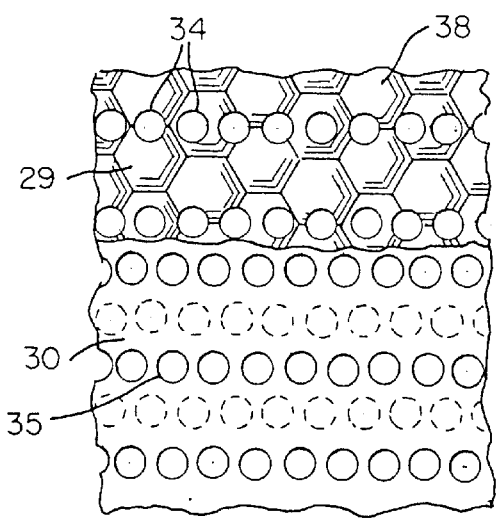
FIG. 3
FIG. 1

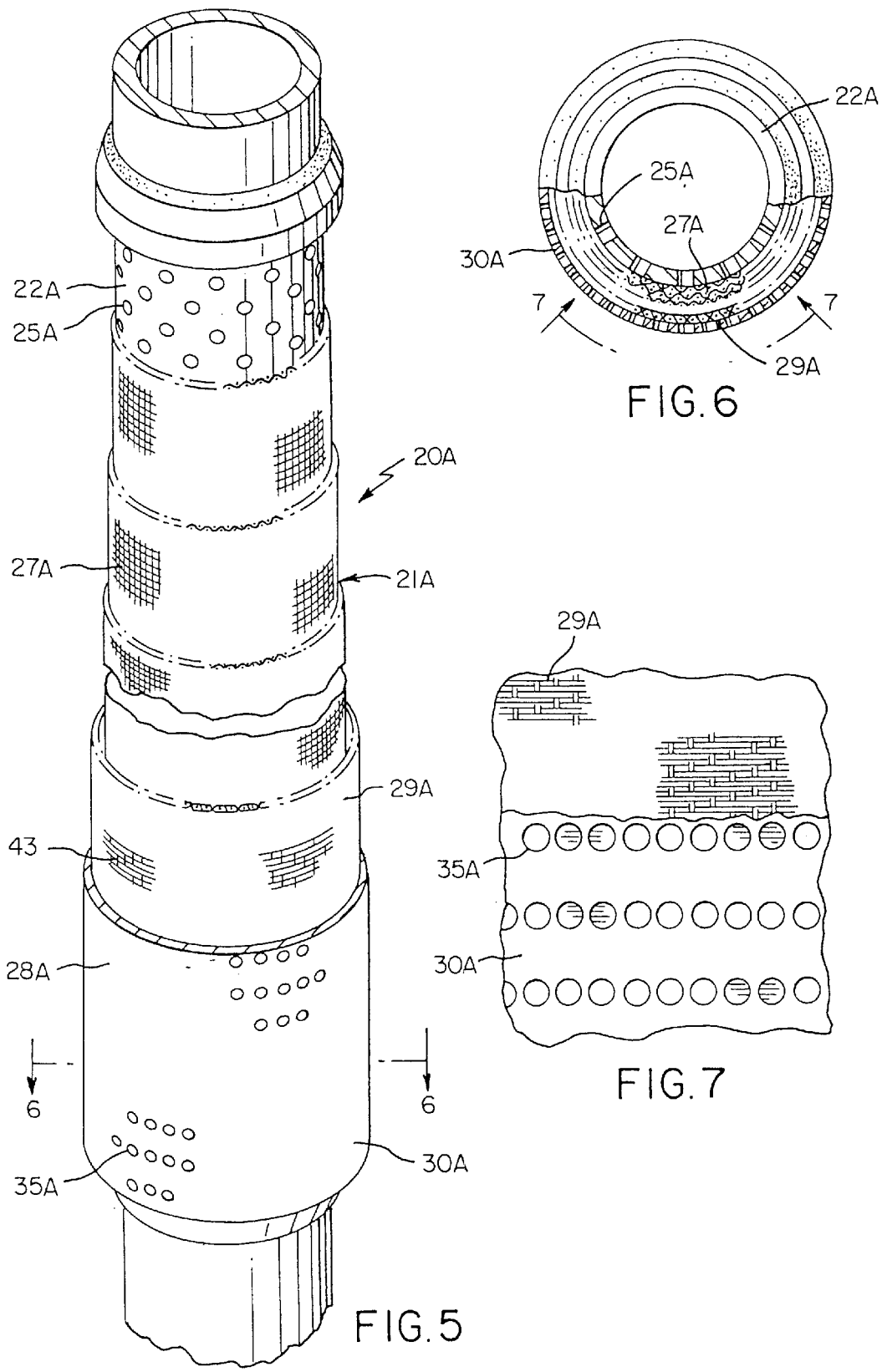

PARTICLE CONTROL SCREEN ASSEMBLY FOR A PERFORATED PIPE USED IN A WELL, A SAND FILTER SYSTEM, AND METHODS OF MAKING THE SAME

This application is a divisional patent application of its parent patent application, Ser. No. 08/694,062, filed Aug. 8, 1996, now U.S. Pat. No. 5,782,299.

BACKGROUND OF THE INVENTION

1. Field of the Invention

This invention relates to a new particle control screen assembly for a perforated pipe used in a well, to a sand filter system, and to methods of making the same.

2. Prior Art Statement

It is known to provide a particle control screen assembly for a perforated pipe used in a well, the assembly including a woven mesh filter media means disposed about the perforated pipe, and a protective wrapper means disposed about the filter media means. See the U.S. Patent to Padden, U.S. Pat. No. 5,411,084; and the U.S. Patent to Whitebay et al, U.S. Pat. No. 5,232,048.

It is also known to provide a protective wrapper means that comprises two cylindrical, spaced-apart tubes that are each provided with holes. See U.S. Patent to Fast, U.S. Pat. No. 4,064,938. The cylindrical walls of the tubes are very thick for erosion control, and although the holes of the respective cylindrical tubes are offset relative to one another, tangential flow through the holes of the outer tube allow relatively direct impingement of fluid from the outside against the filter media means. In addition, due to the thick walls and the spacing between them, this known well screen has a large outer diameter.

SUMMARY OF THE INVENTION

It is therefore an object of the present invention to overcome the drawbacks of the heretofore known screen assemblies and to provide an improved screen assembly that prevents direct impingement of incoming fluid against the filter media means while at the same time minimizing the overall size, and in particular the outer diameter, of such a screen assembly.

This object is realized pursuant to the inventive particle control screen assembly for a perforated pipe used in a well in that the protective wrapper means comprises an outer perforated layer, and an inner layer that is disposed between the outer perforated layer and the filter media means, the inner layer having a first surface that faces the outer perforated layer and has a non-smooth contour, said first surface of the inner layer having portions thereof in direct contact with an inwardly facing surface of the outer perforated layer, and the inner layer being provided with apertures that are disposed in such a way that fluid cannot flow from an outer surface of the outer perforated layer directly radially both through holes of said outer perforated layer and said apertures of said inner layer.

Accordingly, it is an object of this invention to provide a novel particle control screen assembly having one or more of the novel features of this invention as set forth above or hereinafter shown or described.

Another object of this invention is to provide a new method of making such a particle control screen assembly, the method of this invention having one or more of the novel features of this invention as set forth above or hereinafter shown or described.

Yet another object of this invention is to provide a new sand filter system comprising a particle control screen assembly disposed about a perforated pipe for use in a well, such a filter system having one or more of the novel features of this invention as set forth above or hereinafter shown or described.

Other objects, uses and advantages of this invention are apparent from a reading of the specification in conjunction with the accompanying schematic drawings, which form a part thereof and wherein:

BRIEF DESCRIPTION OF THE DRAWINGS

FIG. 1 is a partially cross-sectioned view showing one exemplary embodiment of the sand control screen assembly of this invention mounted on a base pipe in a well;

FIG. 2 is a cross-sectional view taken along the line 2—2 in FIG. 1;

FIG. 3 is a fragmentary, partially broken-away view of the two outer layers of the inventive screen assembly taken in the direction of the arrows 3—3 in FIG. 2;

FIG. 5 is a view similar to that of FIG. 4 of a second exemplary embodiment of the sand control screen assembly of this invention;

FIG. 6 is a cross-sectional view taken along the line 6—6 in FIG. 5;

FIG. 7 is a fragmentary, partially broken-away view of the two outer layers of the inventive screen assembly taken in the direction of the arrows 7—7 in FIG. 6;

DESCRIPTION OF PREFERRED EMBODIMENTS

Figure 4:
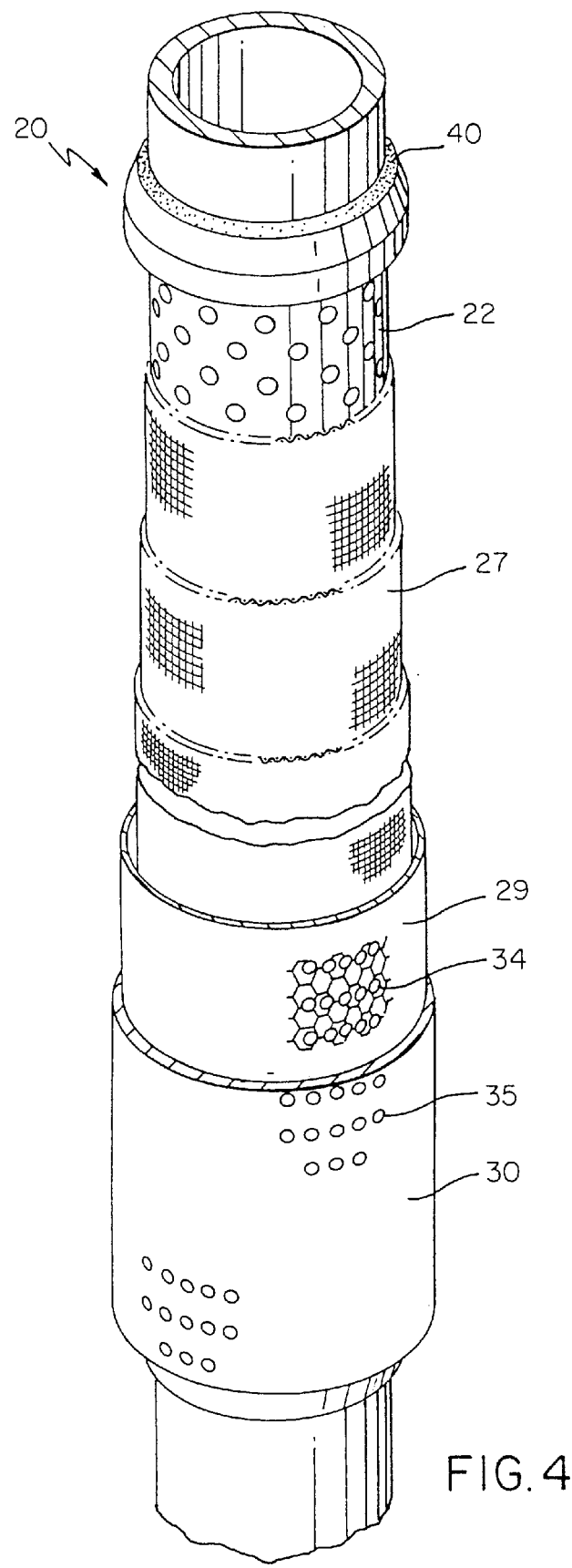
FIG. 4 is a partially cross-sectioned and partially broken-away view showing the various layers of the sand filter system of FIG. 1.

While the various features of this invention are hereinafter illustrated and described as providing a sand control screen assembly for a perforated pipe in an oil and/or gas producing well, it is to be understood that the various features of this invention can be utilized singly or in various combinations thereof to provide a sand or particle control screen assembly for other systems and applications as desired.

Therefore, this invention is not to be limited to only the embodiments illustrated in the drawings because the drawings are merely utilized to illustrate one of the wide variety of uses of this invention.

Referring now to the drawings, the improved sand or particle filter system of this invention is generally indicated by the reference numeral 20 in the embodiment illustrated in FIGS. 1–4, and comprises a well screen or particle control screen assembly 21 that is mounted on a base pipe 22 that is disposed, for example, in the wellbore 23.

In order to be able to draw in, for example, petroleum or natural gas from the wellbore 23, a portion of the base pipe 22 is perforated by the holes 25. To prevent sand or other particles from being drawn into the base pipe 22 through such holes 25, the perforated portion of the base pipe is covered by the particle control screen assembly 21. In the embodiment illustrated in FIGS. 1–4 (see also FIG. 8), the screen assembly 21 comprises a preferably multi-layer woven mesh filter media means 27 followed by a protective wrapper means 28. This protective wrapper means comprises an inner perforated layer 29 and an outer perforated layer 30. The protective wrapper means 28 is spaced or separated from the filter media means 27 by a gap 32 for a reason to be discussed in detail subsequently.

Figure 8:
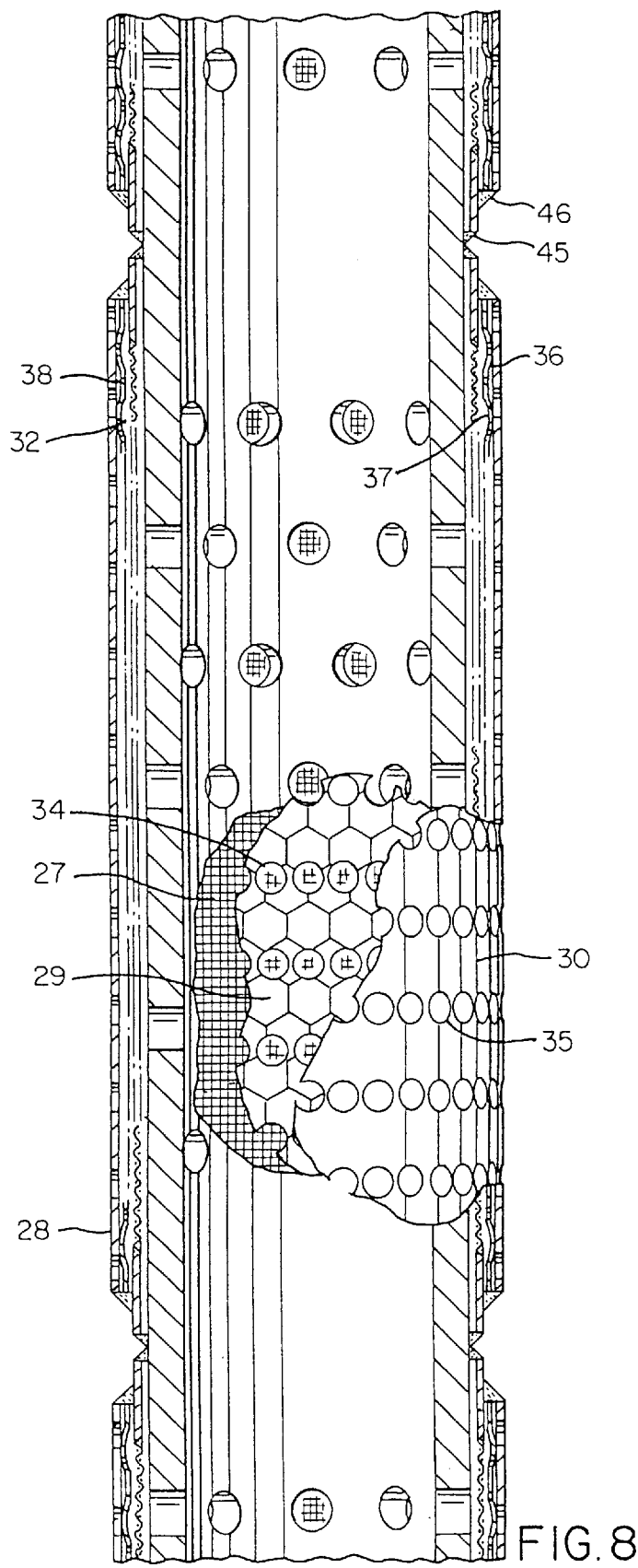
FIG. 8 is a partially cross-sectioned and partially broken away view illustrating one manner for holding the layers of the inventive screen assembly in place relative to one another and for mounting such screen assembly on the base pipe.

As can be seen particularly clearly in FIGS. 3 and 8, the inner perforated layer 29 is provided with holes 34, while the outer perforated layer 30 is provided with holes 35. These holes 34, 35 are offset from one another as viewed in a radial direction, again, for a purpose that will be discussed in greater detail subsequently.

A feature of the inventive screen assembly that, enhances the advantage achieved therewith can be seen in the particular configuration of the inner perforated layer 29. In particular, the surfaces 36 and 37 of the inner layer 29 are not smooth, being structured or profiled. And more particularly, especially the outer surface 36 of the inner layer 29 has an embossed, i.e. a non-smooth, contour that is designated generally by the reference numeral 38. However, due to the thinness of the inner layer 29, an embossment of this layer will inherently result in a non-smooth contour on the inner surface 37 similar to the non-smooth contour 38 of the outer surface 36 of the inner layer 29. To form the inventive sand filter system, an appropriate single or multi-layer woven mesh filter media means 27 is disposed about the base pipe 22, and in particular about the perforated portion 25 thereof. The now cylindrically shaped filter media means 27 is secured to the base pipe 22, for example by being welded thereto; representative weld locations 40 are indicated in FIG. 1. The protective wrapper means 28, which comprises the inner perforated layer 29 and the outer perforated layer 30, which can, for example, be welded together, similarly has a cylindrical shape and can then be disposed about the filter media means 27 to complete assembly of the sand filter system. To accomplish this, the inner diameter of the inner perforated layer 29 of the protective wrapper means 28 has an inner diameter that is slightly greater than the outer diameter of the filter means 27 to allow the protective wrapper means 28 to be slid over the filter media means 27 to complete assembly of the sand filter system. In so doing, the gap 32 results between the inner perforated layer 29 and the filter media means 27. The protective wrapper means 28 is then secured in position on the filter means 27, for example by being welded thereto; representative weld locations are indicated by the reference numerals 41.

The operation of the inventive sand filter system is as follows. A fluid, such as crude oil or natural gas, is to be drawn through the filter system, either by being pumped therethrough or due to the pressure existing in the borehole, to the earth's surface. In so doing, the fluid first passes through the radially directed holes 35 of the outer perforated layer 30. Since the holes 34 of the inner perforated layer 29 are offset axially and/or circumferentially from the holes 35 of the outer perforated layer 30, the incoming fluid flow is inherently deflected or changes its flow direction and cannot continue to flow directly radially inwardly against the filter media means 27, which as explained previously would result in rapid erosion of the filter media means. After the fluid passes through the holes 35 of the outer perforated layer 30, this fluid is deflected sideways by striking the outer surface 36 of the inner perforated layer 29. This deflection is enhanced by the embossed or non-smooth wavy contour 38 of the outer surface 36 of the inner perforated layer 29. The deflected fluid flow finally reaches the holes 34 of the inner perforated layer 29 and can then pass through the inner perforated layer to the filter media means 27, which effects the actual filtration of the fluid for removal of sand and other particles therefrom so that the fluid can then pass through the holes 25 of the base pipe 22 and can then be drawn to the earth's surface.

In the embodiment of FIGS. 1–4 described above, radial flow through the protective wrapper means 28 is deflected, to prevent damaging direct radial flow against the filter means 27, by providing two perforated layers 29, 30 with the holes of the respective layers being offset relative to one another. However, it has also been found according to the teachings of this invention that the inner layer of the protective wrapper means can also have a configuration that is different from the configuration of the outer perforated layer of the protective wrapper means and still be effective to divert the radial flow of fluid that passes through the holes of the outer perforated layer. For example, reference is now made to FIGS. 5–7, wherein another particle control screen assembly of this invention is generally indicated by the reference numeral 20A and parts thereof similar to the particle control screen assembly 20 of FIGS. 1–4 are indicated by like reference numerals followed by the reference letter "A".

In the embodiment of FIGS. 5–7, the inner layer 29A of the protective wrapper means 28A is in the form of a woven wire mesh layer 43 that is bonded to the outer perforated layer 30A. In a presently preferred embodiment of the control screen assembly 21A, the wire mesh layer 43 comprises a twilled Dutch weave. The important feature of the mesh layer 43 is that it comprises a very coarse weave of approximately 500 to 1000 $\mu$m (in contrast to the filter media means 27, which is typically sized in a range of less than 200 $\mu$m, depending upon the sand and particle size). The mesh layer 43 is intended to act as a flow diffuser rather than as a filter. In particular, in such a weave, the fill wires are separated by warp wires resulting in spaces and a wavy configuration, so that again fluid that passes through the holes 35A of the outer perforated layer 30A is deflected by the wires of the mesh layer 43 to prevent direct radial flow of fluid through the holes 35A of the outer perforated layer 30A and against the filter media means 27A. The deflected fluid flow passes along the wires and then through the spaces of the mesh layer 43 and can then continue on to the filter media means 27A for filtration of sand and other particles therefrom so that the fluid can then pass through the holes 25A of the base pipe 22A. The mesh layer 43 can have a thickness of, for example, 0.040–0.100 of an inch, preferably 0.055–0.059 of an inch.

Figure 9:
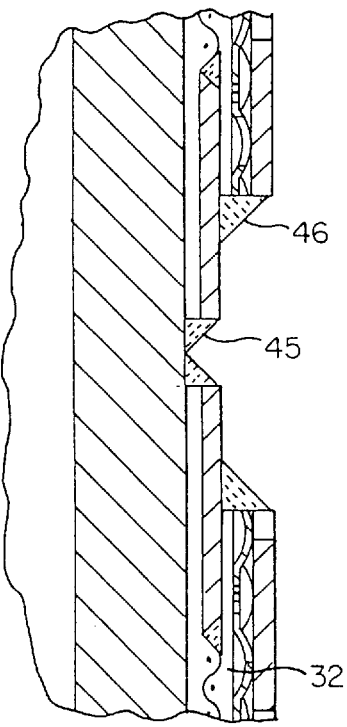
FIG. 9 is an enlarged view of some of the weld locations of the screen assembly of FIG. 8.
Figure 10:
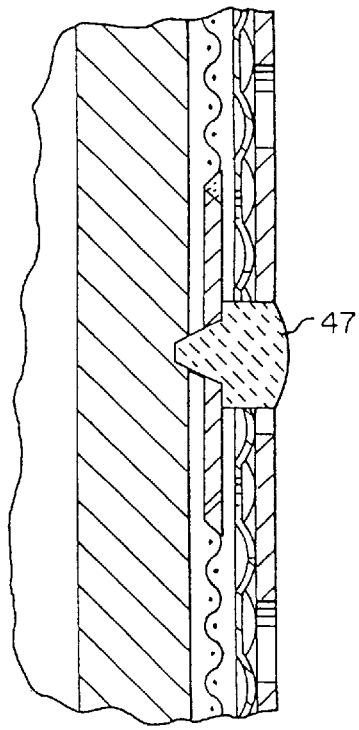
FIG. 10 is an enlarged view of an alternative weld means.

As can be seen from FIG. 8, the screen assembly, be it 21 or 21A, can be assembled along the length of the base pipe in sections of a given length, for example, in four foot or nine foot sections, whereby each section is then secured to the base pipe such as being welded thereto. Furthermore, providing the screen assembly in sections provides structural support for the screen assembly and also makes it possible to maintain the gap 32 between the protective wrapper means 28 and the filter media means 27. Various means for welding the components of the inventive control screen assembly to the base pipe and/or to one another are illustrated in FIGS. 8–10 by the weld locations 45, 46 and 47. Typical lengths for a base pipe are 20, 30 or 40 feet, although shorter or longer lengths are of course possible.

Reference has been made to the multi-layer woven mesh filter media means 27, 27A. This filter media means is preferably a diffusion bonded or sintered wire mesh that is commercially available from Purolator Products Company, 8439 Triad Drive, Greensboro, N.C. and is sold under the Registered Trademark "POROPLATE". The filter media means 27 is preferably comprised of several layers of differing mesh size, for example three layers as illustrated in FIGS. 4 and 5. It would also be possible to dispose a larger mesh layer as a core wrap between the filter media means 27 and the base pipe 22, for example in the situation where a two-layer filter media means is utilized. To provide greater structural support and to better span the holes 25 of the base pipe 22, a coarser weave or meshed layer of the multi-layer structure would be placed closest to the base pipe 22. The filter media means 27 could either have a generally cylindrical configuration as shown in the drawings, or could also be pleated in order to provide a greater surface area for filtration purposes. For example, see the aforementioned U.S. Pat. No. 5,411,084, Padden, whereby this U.S. Patent is being incorporated into this disclosure by this reference thereto.

In a preferred embodiment of the present invention, all of the layers are made of metal, and in particular stainless steel. Furthermore, the layers 29, 30 of the protective wrapper means 28 are relatively thin. For example, the inner perforated layer 29 can have a thickness of 0.020–0.075 of an inch, and in one preferred embodiment has a thickness of 0.025 of an inch, with the embossed depth providing a maximum gap between parts of the outer perforated layer 30 and the outer surface 36 of the inner perforated layer 29 of from 0.040–0.125 of an inch. The thickness of the outer perforated layer 30 can range from 0.060–0.130 of an inch, and in one preferred embodiment has a thickness of 0.060 of an inch. The magnitude of the gap 32 between the filter media means 27 and the protective wrapper means 28 is a minimum of 0.020 of an inch and can range up to 0.125 of an inch or more, although it is advantageous to keep the gap 32 as small as possible so that the overall outer diameter of the completed well screen assembly can be kept to a minimum.

Reference has also been made to the holes 34, 35 in the inner and outer perforated lengths 29, 30 respectively. The number, size and shape of such holes can vary, with an optimum situation being achieved with a maximum open area that nonetheless does not allow any overlap of holes from the outer layer 30 to the inner layer 29 so that a direct or straight through flow of fluid to the filter media means 27 is prevented as previously discussed.

While the forms and methods of this invention now preferred have been illustrated and described as required by the Patent Statute, it is to be understood that other forms and method steps can be utilized and still fall within the scope of the appended claim, wherein each claim sets forth what is believed to be known in each claim prior to this invention in the portion of each claim that is disposed before the terms "the improvement", and sets forth what is believed to be new in each claim according to this invention in the portion of each claim that is disposed after the terms "the improvement", whereby it is believed that each claim sets forth a novel, useful and unobvious invention within the purview of the Patent Statute.

What is claimed is:

1. In a particle control screen assembly for a perforated pipe used in a well, said assembly including a woven mesh filter media means disposed on one side of said perforated pipe, and a protective wrapper means disposed adjacent said filter media means remote from said pipe, the improvement wherein said protective wrapper means comprises a first perforated layer, and a second layer that is disposed between said perforated layer and said filter media means, said second layer having a first surface that faces said perforated layer, said protective wrapper means further comprising means disposed between said first surface of said second layer and a facing surface of said perforated layer such that only portions of said first surface of said inner layer are in direct contact with said facing surface of said perforated layer, said second layer being provided with apertures that are disposed in such a way that fluid cannot flow from an outer surface of said outer perforated layer directly radially both through holes of said perforated layer and said apertures of said second layer.

2. A particle control screen assembly according to claim 1, wherein said woven mesh filter media means is disposed about said perforated pipe, and said protective wrapper means is disposed about said filter media means, and wherein said protective wrapper means comprises a radially outer perforated layer, and as said second layer an inner layer that is disposed between said outer perforated layer and said filter media means.

3. A particle control screen assembly according to claim 2, wherein said means disposed between said second layer and said perforated layer is effected by a non-smooth contour of said first surface of said inner layer.

4. A screen assembly according to claim 3, wherein said inner layer is embossed to effect said non-smooth contour of said first surface thereof, whereby said first surface also has portions that are spaced from said facing surface of said outer perforated layer.

5. A screen assembly according to claim 4, wherein said inner layer is welded to said perforated layer.

6. A screen assembly according to claim 4, wherein said apertures of said inner layer are holes that are offset axially and/or circumferentially relative to said holes of said outer perforated layer.

7. A screen assembly according to claim 4, wherein some of said holes of said inner layer are located closer to said facing surface of said outer perforated layer than are other holes of said inner layer.

8. A screen assembly according to claim 3 wherein said inner layer is spaced from said filter media means.

9. A screen assembly according to claim 3 wherein said filter media means is a multi-layer woven and sintered together mesh.

10. A screen assembly according to claim 3 wherein said filter media means, said inner layer, and said outer perforated layer are all made of metal.

11. A screen assembly according to claim 10 wherein said inner layer is made of stainless steel having a thickness generally of the order of 0.020–0.075 of an inch, and said outer perforated layer is made of stainless steel having a thickness generally of the order of 0.060–0.130 of an inch.

12. A screen assembly according to claim 8 wherein said filter media means, said inner layer, and said outer perforated layer all have an essentially cylindrical configuration.

13. A screen assembly according to claim 3 wherein said inner layer is a woven screen to effect said non-smooth contour of said first surface thereof, whereby said first surface has protruding portions, at least some of which are in direct contact with said facing surface of said perforated layer, and also has portions that are spaced from said facing surface of said outer perforated layer.

14. A screen assembly according to claim 13, wherein said woven screen comprises a twilled Dutch weave.

15. A screen assembly according to claim 14, wherein said apertures of said woven screen are formed by wires of said weave being separated from one another by other wires thereof.

16. A screen assembly according to claim 3 wherein a maximum gap generally of the order of 0.040–0.125 of an inch is provided between parts of said outer perforated layer and said first surface of said inner layer.

17. A screen assembly according to claim 6 wherein said inner layer is spaced generally of the order of 0.020 to 0.125 of an inch from said filter media means .

18. A screen assembly according to claim 13, wherein said woven screen is bonded to said outer perforated layer.

19. In a sand filter system comprising a particle control screen assembly disposed about a perforated pipe for use in a well, said assembly including a woven mesh filter media means disposed about said perforated pipe, an d a protective wrapper means disposed about said filter media means, the improvement wherein said protective wrapper means comprises an outer perforated layer, and an inner layer that is disposed between said outer perforated layer and said filter media means, said inner layer having a first surface that faces said outer perforated layer, said protective wrapper means further comprising means disposed between said first surface of said inner layer and a facing surface of said perforated layer such that only portions of said first surface of said inner layer are in direct contact with an inwardly facing surface of said outer perforated layer, said inner layer being provided with apertures that are disposed in such a way that fluid cannot flow from an outer surface of said outer perforated layer directly radially both through holes of said outer perforated layer and said apertures of said inner layer.

20. In a method of making a particle control screen assembly for a perforated pipe used in a well, said assembly including a woven mesh filter media means disposed about said perforated pipe, and a protective wrapper means disposed about said filter media means, the improvement comprising the step of producing said protective wrapper means to comprise an outer perforated layer, and an inner layer that is disposed between said outer perforated layer and said filter media means, said inner layer having a first surface that faces said outer perforated layer, said protective wrapper means further comprising means disposed between said first surface of said inner layer and a facing surface of said perforated layer such that only portions of said first surface of said inner layer are in direct contact with an inwardly facing surface of said outer perforated layer, said inner layer being provided with apertures that are disposed in such a way that fluid cannot flow from an outer surface of said outer perforated layer directly radially both through holes of said outer perforated layer and said apertures of said inner layer.

* * * * *